US011093291B2

(12) United States Patent
An et al.

(10) Patent No.: US 11,093,291 B2
(45) Date of Patent: Aug. 17, 2021

(54) RESOURCE ASSIGNMENT USING CDA PROTOCOL IN DISTRIBUTED PROCESSING ENVIRONMENT BASED ON TASK BID AND RESOURCE COST

(71) Applicant: KOREA ELECTRONICS TECHNOLOGY INSTITUTE, Seongnam-si (KR)

(72) Inventors: Jae Hoon An, Incheon (KR); Jae Gi Son, Yongin-si (KR); Ji Woo Kang, Gwangju-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 185 days.

(21) Appl. No.: 15/895,242

(22) Filed: Feb. 13, 2018

(65) Prior Publication Data
US 2019/0155657 A1 May 23, 2019

(30) Foreign Application Priority Data
Nov. 17, 2017 (KR) .......................... 10-2017-0153772

(51) Int. Cl.
*G06F 9/50* (2006.01)
(52) U.S. Cl.
CPC .......... *G06F 9/5038* (2013.01); *G06F 9/5016* (2013.01); *G06F 2209/503* (2013.01)
(58) Field of Classification Search
CPC . G06F 9/5038; G06F 9/5016; G06F 2209/503
See application file for complete search history.

(56) References Cited

U.S. PATENT DOCUMENTS

| 8,112,755 | B2* | 2/2012 | Apacible | G06N 20/00 |
| | | | | 718/104 |
| 8,972,306 | B2* | 3/2015 | Nguyen | G01S 13/726 |
| | | | | 706/8 |
| 9,043,401 | B2* | 5/2015 | Wong | H04L 67/1091 |
| | | | | 709/205 |
| 2008/0028409 | A1* | 1/2008 | Cherkasova | G06F 9/5061 |
| | | | | 718/104 |
| 2011/0066556 | A1* | 3/2011 | Kadosh | G06Q 50/188 |
| | | | | 705/80 |

(Continued)

OTHER PUBLICATIONS

PCMAG Encyclopedia "Blade server" Accessible Jul. 26, 2013 at https://www.pcmag.com/encyclopedia/term/38745/blade-server (Year: 2013).*

(Continued)

*Primary Examiner* — Meng Ai T An
*Assistant Examiner* — Michael W Ayers
(74) *Attorney, Agent, or Firm* — Hauptman Ham, LLP

(57) ABSTRACT

A resource assignment method, and a recording medium and a distributed processing device applying the same are provided. The resource assignment method includes: when information regarding a plurality of tasks is received from a plurality of first nodes, calculating a size of a resource necessary for each of the received plurality of tasks; and when information regarding an available resource is received from a second node, assigning one of the plurality of tasks to the available resource of the second node, based on the calculated size of the resource necessary for each task.

7 Claims, 6 Drawing Sheets

(56) References Cited

U.S. PATENT DOCUMENTS

| | | | |
|---|---|---|---|
| 2013/0212279 A1* | 8/2013 | Dutta | G06F 9/5061 |
| | | | 709/226 |
| 2013/0268944 A1* | 10/2013 | Fellenstein | G06F 8/61 |
| | | | 718/104 |
| 2013/0346994 A1* | 12/2013 | Chen | G06F 9/5044 |
| | | | 718/104 |
| 2014/0229621 A1* | 8/2014 | Song | H04L 47/822 |
| | | | 709/226 |
| 2014/0269284 A1* | 9/2014 | Amanna, III | H04L 5/0037 |
| | | | 370/230.1 |
| 2016/0127255 A1* | 5/2016 | Cobb | H04L 41/0896 |
| | | | 709/226 |
| 2017/0109815 A1* | 4/2017 | Bai | H04L 41/5029 |
| 2017/0132747 A1* | 5/2017 | Wilt | G06T 1/20 |

OTHER PUBLICATIONS

Deepal Jayasinghe et al., "Improving Performance and Availability of Services Hosted on IaaS Clouds with Structural Constraint-aware Virtual Machine Placement," 2011 IEEE International Conference on Services Computing, Jul. 2011, pp. 72-79.

Hesam Izakian et al., "A Continuous Double Auction Method for Resource Allocation in Computational Grids," 2009 IEEE Symposium on Computational Intelligence in Scheduling, Mar. 2009.

Korean Office Action dated Apr. 16, 2019 in connection to counterpart Korean Patent Application No. 10-2017-0153772, citing the above references.

\* cited by examiner

FIG. 4

| No. | type | location | request/allocation | Bid | Input |
|---|---|---|---|---|---|
| 1 | demand_1 | dc:1, rack:1 | CPU 2, MEM 1024mb | 50 | 10.0.0.3 |
| 2 | demand_2 | dc:1, rack:1 | CPU 1, MEM 1024mb | 100 | 10.0.0.3 |
| 3 | supply_1 | dc:1, rack:1, server: 10.0.0.1 | CPU 2, MEM 1024mb | | |
| 4 | demand_3 | dc:1, rack:2 | CPU 1, MEM 1024mb | 20 | 10.0.0.4 |
| 5 | supply_2 | dc:1, rack:2, agent: 10.0.0.4 | CPU 1, MEM 1024mb | | |
| 6 | supply_3 | dc:1, rack:1, agent: 10.0.0.3 | CPU 1, MEM 1024mb | | |

FIG. 5

| Supply | Demand | Score |
|---|---|---|
| supply_1 | demand_1 | 5 |
| supply_1 | demand_2 | 5 |

FIG. 6

| Supply | Demand | Score |
|---|---|---|
| supply_2 | demand_2 | 1 |
| supply_2 | demand_3 | 20 |

RESOURCE ASSIGNMENT USING CDA PROTOCOL IN DISTRIBUTED PROCESSING ENVIRONMENT BASED ON TASK BID AND RESOURCE COST

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Nov. 17, 2017, and assigned Serial No. 10-2017-0153772, the entire disclosure of which is hereby incorporated by reference.

TECHNICAL FIELD OF THE INVENTION

The present disclosure relates generally to a resource assignment method, and a recording medium and a distributed processing device applying the same, and more particularly, to a resource assignment method using a continuous double auction (CDA) protocol in a distributed processing environment, and a recording medium and a distributed processing device applying the same.

BACKGROUND OF THE INVENTION

The following information is presented as background information regarding embodiments and does not constitute prior art.

Currently, distributed processing systems such as Hadoop or Spark use a scheduling algorithm such as first in first out (FIFO), Fair, etc. The FIFO processes the oldest task first. This algorithm may not consider priority of tasks, and may be effective when performing a task having a low load, and may not be suitable to a large cluster. When a task with a high load is performed, all resources of the cluster are occupied and thus there is a problem that another task has a long waiting time. The Fair equally shares resources for each task. When a task is added, the resources may be re-assigned to the new task, such that all tasks have the resources at the same ratio. However, when there are many tasks to be performed, this algorithm may cause an overhead because it has to re-consider already assigned resources and to re-assign the resources every time a task is added. As described above, the existing scheduling algorithm does not consider a size of a resource required by each task, and thus may cause a problem that excessive resources may be assigned to a task with a low load, or few resources may be assigned to a task with a relatively high load. Therefore, there is a problem that an overall processing speed is reduced or an overhead increases due to frequent re-assignment of whole resources.

Due to these phenomena, the task processing performance may be degraded or resources may be wasted even when there are sufficient resources in the cluster, and there is a problem that the overhead increases due to the frequent re-assignment of the whole resources.

SUMMARY OF THE INVENTION

To address the above-discussed deficiencies of the prior art, it is a primary aspect of the present disclosure to provide a resource assignment method of a distributed processing system, and a recording medium and a distributed processing device applying the same, wherein the resource assignment method includes: when information regarding a plurality of tasks is received from a plurality of first nodes, calculating a size of a resource necessary for each of the received plurality of tasks; and when information regarding an available resource is received from a second node, assigning one of the plurality of tasks to the available resource of the second node, based on the calculated size of the resource necessary for each task.

The technical objects that can be achieved by the present disclosure are not limited to those mentioned in the above, and other technical objects that are not mentioned herein could be clearly understood by a person skilled in the art based on the following descriptions.

According to one aspect of the present disclosure, a method for assigning a resource in a distributed processing system includes: when information regarding a plurality of tasks is received from a plurality of first nodes, calculating a size of a resource necessary for each of the received plurality of tasks; and, when information regarding an available resource is received from a second node, assigning one of the plurality of tasks to the available resource of the second node, based on the calculated size of the resource necessary for each task.

The assigning may include calculating scores of the plurality of tasks, and assigning a task having a highest score to the corresponding available resource.

In addition, the score may be calculated by dividing a Bid by a Cost.

In addition, the Bid may be calculated by dividing a default value by a number of tasks included in one directed acyclic graph (DAG) including the corresponding task.

In addition, the Cost may be calculated by considering a difference between a number of available CPUs and a number of necessary CPUs, a difference between an available memory and a necessary memory, and a network distance between the first node and the second node.

In addition, the network distance may correspond to a first distance value when the first node and the second node belong to different data center, to a second distance value when the first node and the second node belong to different racks in the same data center, to a third distance value when the first node and the second node belong to different servers in the same rack, and to a fourth distance value when the first node and the second node belong to the same server.

The first distance value may be larger than the second distance value, the second distance value may be larger than the third distance value, and the third distance value may be larger than the fourth distance value.

The method may further include transmitting the information regarding the available resource of the second node to the first node which is assigned the available resource.

The calculating may include calculating the size of the resource including the number of CPUs and a memory capacity necessary for each task.

According to another aspect of the present disclosure, a computer readable recording medium records a computer program performing a method for assigning a resource, wherein the method includes: when information regarding a plurality of tasks is received from a plurality of first nodes, calculating a size of a resource necessary for each of the received plurality of tasks; and, when information regarding an available resource is received from a second node, assigning one of the plurality of tasks to the available resource of the second node, based on the calculated size of the resource necessary for each task.

According to still another aspect of the present disclosure, a distributed processing device includes: a communication unit configured to receive information regarding a plurality of tasks from a plurality of first nodes, and to receive information regarding an available resource from a second node; and a controller configured to, when the information regarding the plurality of tasks is received from the plurality of first nodes, calculate a size of a resource necessary for each of the received plurality of tasks, and when the information regarding the available resource is received from the second node, to assign one of the plurality of tasks to a corresponding available resource, based on the calculated size of the resource necessary for each task.

According to yet aspect of the present disclosure, a distributed processing system includes: a plurality of first nodes configured to transmit information regarding a plurality of tasks; a second node configured to transmit information regarding an available resource; and a distributed processing device configured to, when the information regarding the plurality of tasks is received from the plurality of first nodes, calculate a size of a resource necessary for each of the received plurality of tasks, and when the information regarding the available resource is received from the second node, to assign one of the plurality of tasks to a corresponding available resource, based on the calculated size of the resource necessary for each task.

According to various embodiments of the present disclosure, a resource assignment method of a distributed processing system, and a recording medium and a distributed processing device applying the same are provided, wherein the resource assignment method includes: when information regarding a plurality of tasks is received from a plurality of first nodes, calculating a size of a resource necessary for each of the received plurality of tasks; and when information regarding an available resource is received from a second node, assigning one of the plurality of tasks to the available resource of the second node, based on the calculated size of the resource necessary for each task. Therefore, a size of a resource necessary for each task is calculated, and according to priority, resources are dynamically assigned. When a new task is added to the distributed cluster, an overhead caused by frequency re-assignment of whole resources can be reduced. In addition, a processing speed can be enhanced by considering a network distance between nodes in which input data is stored due to the characteristic of divided tasks.

The effects that can be achieved by the present disclosure are not limited to those mentioned in the above, and other effects that are not mentioned herein could be clearly understood by a person skilled in the art based on the following descriptions.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a table showing a list of demands and supplies for distributed processing of tasks according to an embodiment of the present disclosure;

FIG. 5 is a table showing scores of demand nodes with respect to a supply node supply_1 according to an embodiment of the present disclosure;

FIG. 6 is a table showing scores of demand nodes with respect to a supply node supply_2 according to an embodiment of the present disclosure.

DETAILED DESCRIPTION OF THE INVENTION

Figure 1:
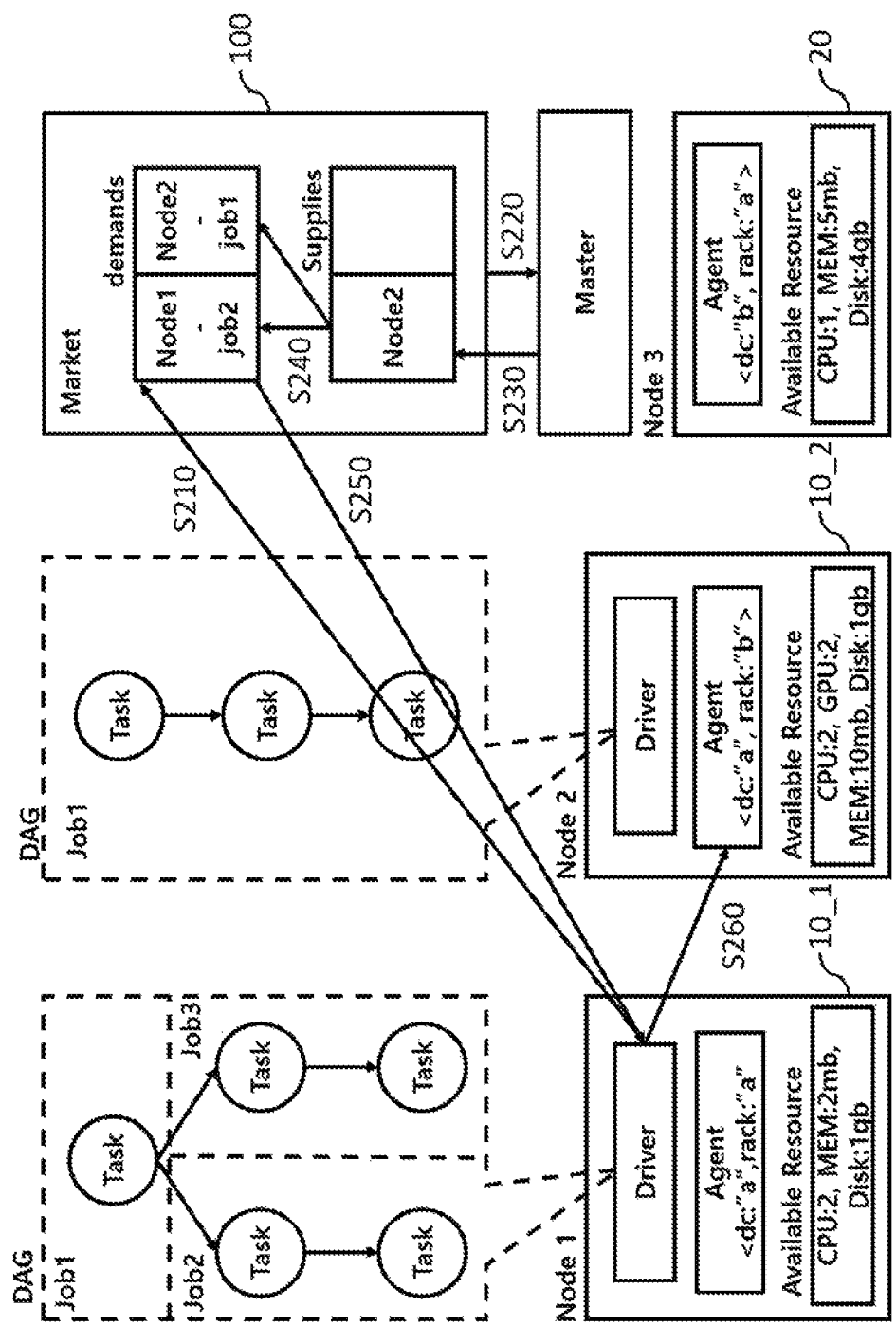
FIG. 1 is a view schematically showing a resource assignment method in a distributed processing system according to an embodiment of the present disclosure.

The present disclosure will now be described more fully with reference to specific embodiments of the present disclosure illustrated in the accompanying drawings to clarify features and advantages of the present disclosure.

In the following description and the accompanying drawings, well-known functions or constructions are not described in detail since they would obscure the invention in unnecessary detail. In addition, it should be noted that, throughout the drawings, the same reference numerals are used for the same elements if possible.

Terms or words used in the following description and drawings should not be interpreted as being limited to general and dictionary definition, and should be interpreted as having definitions and concepts suitable for the technical idea of the present disclosure, based on the principle that the inventors can appropriately define the terms as concepts for explaining their invention in the best method.

Accordingly, the constructions illustrated in the embodiments and drawings of the present specification are merely the most preferred embodiment of the present disclosure, and do not represent all technical ideas of the present disclosure. Therefore, the embodiments should be construed as including various equivalents and modifications substituted therefor at the time of filing.

The terms such as "first" or "second" used in various embodiments may be used to explain various elements and to distinguish one element from another element, but do not limit the elements. For example, without departing the scope of the present disclosure, a second element may be referred to as a first element, and similarly, a first element may be referred to as a second element.

It will be understood that when an element is referred to as being "coupled to" or "connected to" another element, it can be logically or physically coupled or connected to another element.

In other words, an element may be directly coupled or connected to another element, but there may be an intervening element therebetween or the element may be indirectly coupled or connected to another element.

The terms "include" or "have" used in the present specification indicate the presence of features, numbers, steps, operations, elements, components or a combination thereof described in the specification, and do not preclude the presence or addition of one or more other features, numbers, steps, operations, elements, components, or a combination thereof.

The terms "unit" and "module" and the terms having suffix "-er" or "-or" used in the specification refer to a unit for processing at least one function or operation, and may be implemented by hardware, software, or a combination of hardware and software.

As used herein, the terms "a", "an," "one," "the," and similar terms thereto are intended to include the singular forms and the plural forms, unless the context describing the present disclosure (in particular, the context of claims presented below) clearly indicates otherwise.

Hereinafter, the present disclosure will be described in more detail with reference to the drawings.

FIG. 1 is a view schematically showing a resource assignment method in a distributed processing system according to an embodiment of the present disclosure.

As shown in FIG. 1, the distributed processing system includes a plurality of demand nodes which transmit information regarding a plurality of tasks, a supply node which transmits information regarding an available resource, and a distributed processing device 100 which, when receiving the information regarding the plurality of tasks from the plurality of demand nodes, calculates a size of a resource necessary for each of the plurality of tasks, and, when receiving the information regarding the available resource from the supply node, assigns one of the plurality of tasks to the corresponding available resource, based on the calculated size of the resource necessary for each job.

As shown in FIG. 1, the distributed processing system may include a plurality of nodes, and may include nodes corresponding the demand nodes requesting processing of tasks, and supply nodes assigning available resources and processing the requested tasks, and may include the distributed processing device 100 which assigns available resources to the tasks and controls an overall operation of distributed processing.

In FIG. 1, Node 1 10_1 and Node 2 10_2 correspond to the demand nodes requesting tasks, and Node 3 20 corresponds to the supply node assigning an available resource and processing a requested task.

Although FIG. 1 depicts two demand nodes and one supply node, this is merely an example, and both the demand node and the supply mode may be provided in plural number.

In addition, although FIG. 1 depicts that the demand nodes and the supply node are separate nodes, this is merely for convenience of explanation. One node may be a supply node, and simultaneously, may serve as a supply node. For example, Node 1 10_1 may request the distributed processing device 100 to process a task as a demand node, and also, may transmit an available resource to the distributed processing device 100 as a supply node, and may be assigned a requested task and may process the task.

As shown in FIG. 1, each node may correspond to a server that is installed on a specific rack in a specific data center. Specifically, it can be seen that Node 1 10_1 is a server that is installed on a rack "a" of a data center (dc) "a," Node 2 10_2 is a server that is installed on a rack "b" of the data center (dc) "a," and Node 3 20 is a server that is installed on a rack "a" of a data center (dc) "b." That is, it can be seen that Node 1 10_1 and Node 2 10_2 are installed in the same data center, but installed on different racks, and Node 3 20 is installed in a different data center.

In addition, as shown in FIG. 1, it can be seen that the nodes own their respective available resources. Specifically, Node 1 10_1 may include two central processing units (CPUs), a 2-megabyte (mb) memory (MEM), a 1 gigabyte (gb) disk, Node 2 10_2 may include two CPUs, two graphic processing units (GPUs), a 10-megabyte (mb) memory (MEM), and a 1-gigabyte (gb) disk, and Node 3 20 may include one CPU, a 5-megabyte (mb) memory (MB), and a four-gigabyte (gb) disk.

The demand nodes may schedule processing of various tasks to perform a certain operation or process data, and request the distributed processing device 100 to process the tasks. Specifically, Node 1 10_1 may require five tasks (Task 1 to Task 5) in total in order to perform one operation, and may request the distributed processing device 100 to perform distributed processing for the five tasks. Herein, a directed acyclic graph (DAG) indicates a graph which is formed of tasks necessary for one operation. The DAG may be formed of at least one job, and the job indicates a precise unit of an operation and may be formed of at least one task. In the case of Node 1 10_1, one DAG may include three jobs (Job 1, Job 2, Job 3), and Job 1 may include one task (Task 1), Job 2 may include two tasks (Task 2, Task 3), and Job 3 may include two tasks (Task 4, Task 5). In this situation, processing of the DAG of the operation including such three jobs is required. In addition, in the case of Node 2 10_2, one DAG may include one job (Job 1), and Job 1 may include three tasks (Task 1, Task 2, Task 3). In this situation, processing of the DAG of the operation including such one job is required.

The demand node may include a driver that schedules the processing of the tasks and requests the distributed processing device 100.

The distributed processing device 100 may include a market unit and a master unit. The market unit may include a demands region where tasks requested to be distributed-processed are registered, and a supplies region where a supply node having an available resource is registered. As shown in FIG. 1, Task 2 of Job 2 of Node 1 and Task 1 of Job 1 of Node 2 are registered as demands, and the supply node Node 3 20 is registered as a supply. When a task is registered as a demand, the master unit may calculate a size of a resource required to process the corresponding task, and may discover a supply node corresponding thereto and may register the same as a supply.

The distributed processing system having the above-described configuration may dynamically schedule the tasks by using a continuous double auction (CDA) protocol, which matches a supply and a demand. The CDA protocol may assign an optimal resource to a task, and determine priority. When the distributed processing device 100 registers a task received at the market unit as a supply and registers an available resource as a supply, the master unit may match, with the supply node, a task that incurs a low cost, has a high priority, and is registered early from among all of the tasks meeting a restriction condition of tasks for resource assignment.

Figure 2:
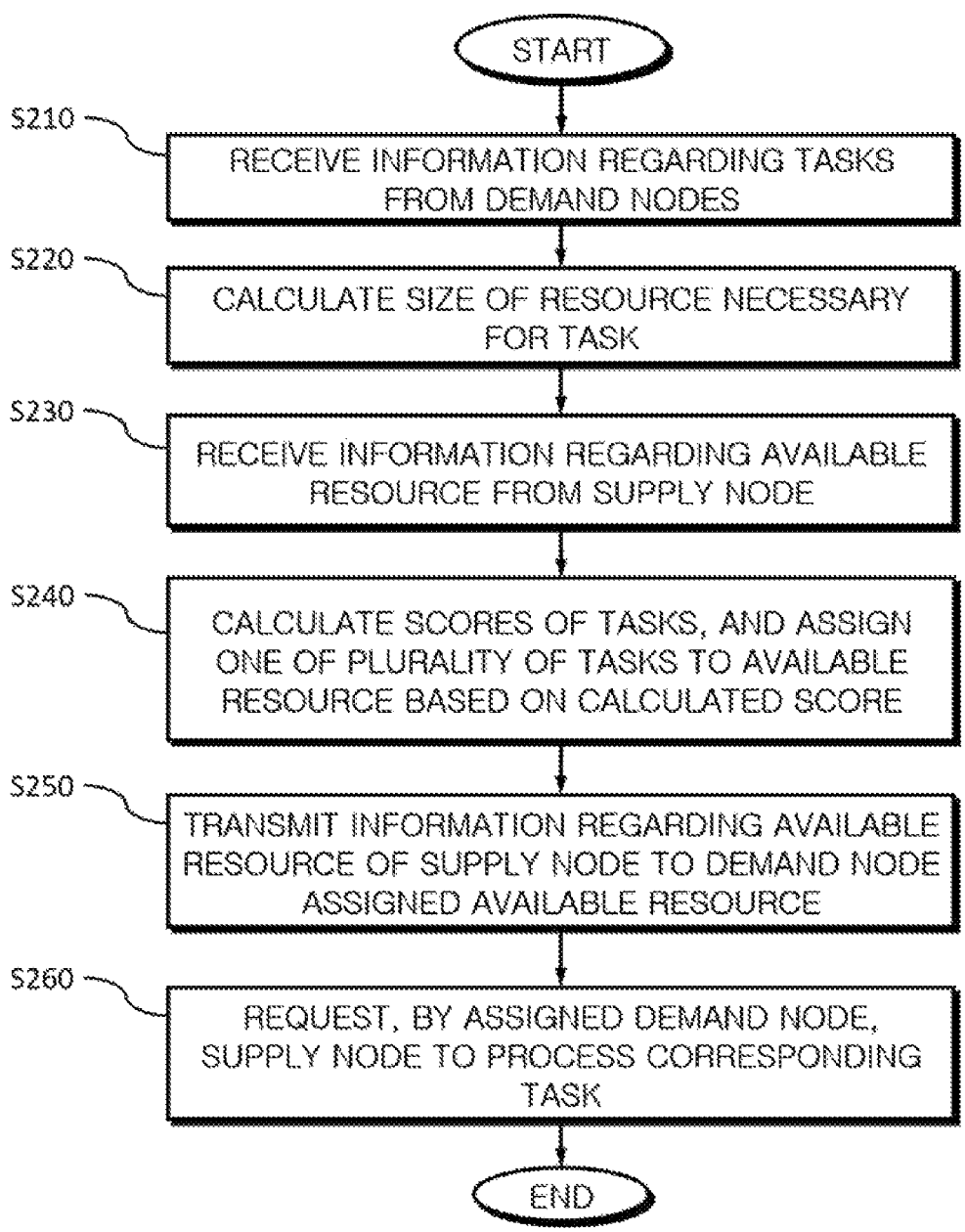
FIG. 2 is a flowchart provided to explain a resource assignment method in a distributed processing system according to an embodiment of the present disclosure.

Hereinafter, the resource assignment method will be described in more detail with reference to FIG. 1 and FIG. 2. FIG. 2 is a flowchart provided to explain the resource assignment method in the distributed processing system according to an embodiment of the present disclosure.

First, the distributed processing device 100 receives information regarding a plurality of tasks from a plurality of demand nodes (S210). For example, as shown in FIG. 1, the distributed processing device 100 may receive information regarding tasks from the supplies nodes, Node 1 10_1 and Node 2 10_2, and may register Task 2 of Job 2 of Node 1 10_1 and Task 1 of Job 1 of Node 2 10_2 as supplies.

Then, the distributed processing device 100 may calculate a size of a resource necessary for each of the received plurality of tasks (S220). Specifically, the distributed processing device 100 may calculate the size of the resource including the number of CPUs, a capacity of a memory, and a capacity of a disk, which are necessary for each task. For example, in the case of FIG. 1, the distributed processing device 100 may calculate one CPU, a 2-gigabyte memory, and a 1 gigabyte disk, as a size of a resource necessary for Task 2 of Job 2 of Node 1 10_1, and may calculate two CPUs, a 4-gigabyte memory, and a 2-gigabyte disk as a size of a resource necessary for Task 1 of Job 1 of Node 2 10_2. In this case, the distributed processing device 100 may calculate the resource necessary for the task based on a resource hint. Herein, the resource hint may indicate a default value which is pre-set according to a type of an operation of each task (Map, Reduce, Sort, Partition, etc.) or a parallel unit of each task. In addition, the distributed processing device 100 may give a priority to each type of task according to user's setting.

Thereafter, the distributed processing device 100 may discover and select a supply node that has an available resource for processing the tasks registered as the supplies from nodes in the data centers and the racks, and may receive information regarding the available resource from the selected supply node (S230). In this case, the available resources may be the total resources of the corresponding supply node minus the already assigned resources. Then, the distributed processing device 100 may register the information regarding the available resource of the supply node as a supply. In the case of FIG. 1, the distributed processing device 100 may register the supply node, Node 3 20, as a supply, and may identify that the available resources are one CPU, a 5-megabyte (mb) memory, and a four-gigabyte (gb) disk.

Thereafter, the distributed processing device 100 may calculate scores regarding the plurality of tasks based on the calculated size of the resource necessary for each task, and may assign one of the plurality of tasks to the available resource of the corresponding supply node (S240). In this case, the distributed processing device 100 may assign a task having the highest score to the corresponding available resource. When there exist tasks having the same highest score, the distributed processing device 100 may assign a task the information of which is received first and which is registered as a supply to the available resource.

Specifically, the distributed processing device 100 may calculate Match, which is a function for matching a demand (d) which is a task registered as a demand, with a supply (s) which is a selected supply node, by using Equation 1 presented below. In the following description, the supply node may be indicated by a supply (s) and the task registered as a demand may be indicated by a demand (d or d_1 to d_n).

$$\text{Match}(s, d_k) = \max(\text{Score}(s, d_1) L \ \text{Score}(s, d_n)) \quad \text{Equation 1}$$

That is, the distributed processing device 100 may calculate demands d_1 to d_n indicating tasks registered for all demands registered with respect to a supply (s) indicating a selected supply node, and scores of the demands, and may match a demand (d_k) and a supply (s) maximizing the score.

That is, the distributed processing device 100 may calculate a score of each of the tasks corresponding to the supply node. In this case, the distributed processing device 100 may calculate the Score by dividing a Bid by a Cost as shown in Equation 2 presented below:

$$\text{Score}(s, d) = \frac{B\dot{\imath}d(d)}{\text{Cost}(s, d)} \quad \text{Equation 2}$$

As shown in Equation 2, the distributed processing device 100 may calculate the Score by dividing the Bid of the demand (d) by the Cost incurred by assigning the supply (s) to the demand (d).

The distributed processing device 100 may calculate the Bid by dividing the default value (bid) by the number of tasks included in one DAG including the corresponding task. That is, the distributed processing device 100 may calculate the Bid of the demand (d) by dividing the default value (bid) by the number of tasks (n) included in the DAG as shown in Equation 3 presented below:

$$B\dot{\imath}d(d) = \frac{b\dot{\imath}d}{n} \quad \text{Equation 3}$$

The default value (bid) has an initial value set to 100 and may be manually set. In addition, the distributed processing device 100 may set different values as the default value according to a priority corresponding to the type of the corresponding task. For example, the distributed processing device 100 may give a high priority to a type of a task which needs to be urgently executed, and may set the default value (bid) to 100, and may give a low priority to a type of task which does not need to be urgently executed, and may set the default value (bid) to 50.

The number of tasks (n) refers to the number of tasks in one DAG to which the task belongs. Since a task load of a driver program increases as the number of tasks (n) increases (since a unit divided by a task causes disk io or a parallel unit extends and is reduced), the distributed processing device 100 may set the equation to set the Bid to be reduced as the number of tasks (n) increases.

In addition, the distributed processing device 100 may calculate the Cost by considering a difference between the number of available CPUs and the number of necessary CPUs, a difference between the available memory and the necessary memory, and a network distance between the demand node and the supply node. Herein, the network distance is a distance concept indicating how far the demand node and the supply node are spaced apart from each other in a network concept, and the distributed processing device 100 may set the network distance to a first distance value when the demand node and the supply node belong to different data centers, to a second distance value when the nodes belong to different racks in the same data center, to a third distance value when the nodes belong to different servers in the same rack, and to a fourth distance value when the nodes belong to the same server. In addition, the distributed processing device 100 may set the first distance value to be larger than the second distance value, set the second distance value to be larger than the third distance value, and set the third distance value to be larger than the fourth distance value.

Specifically, the Cost of the supply (s) and the demand (d) may be calculated by considering the least difference between the number of assigned supply CPUs (Cpu_s) and the number of requested CPUs (Cpu_d), the least difference between the number of supply memories (Mem_s) and the number of requested memories (Mem_d), and the network distance between all input nodes (N_di_k) of the demand (d) and the supply node (N_s), as shown in Equation 4 presented below:

$$\text{Cost}(s, d) = (|(Cpu_s - Cpu_d)| * 10) + \\ (|(Mem_s - Mem_d)| * 10) + \sum_{k=1}^{n} networkdistance(N_{di_k}, N_s) \qquad \text{Equation 4}$$

In addition, the network distance between the two nodes may be calculated by Equation 5 presented below, for example. The network distance may be set to 1000 when the data centers (dc) of the two nodes are different, to 100 when the racks of the two nodes are different, or to 10 when the servers of the two nodes are different, and the default value of 1 may be when all factors are the same.

$$networkdistance(N_x, N_y) = \begin{cases} dc_x \neq dc_y, & 1000 \\ rack_x \neq rack_y, & 100 \\ server_x \neq server_y, & 10 \\ default, & 1 \end{cases} \qquad \text{Equation 5}$$

Through the above-described process, the distributed processing device 100 may calculate the scores regarding the plurality of tasks based on the calculated sizes of the resource necessary for each job, and may assign one of the plurality of tasks to the available resource of the corresponding supply node.

Thereafter, the distributed processing device 100 may transmit the information regarding the available resource of the supply node to the demand node assigned the available resource (S250). For example, in the case of FIG. 1, since the available resource of the supply node, Node 3 20, is assigned to the supply node, Node 1 10_1, the distributed processing device 100 may transmit the information regarding the available resource of Node 3 20 to Node 1 10_1.

Then, the demand node assigned the resource may request the supply node to process the corresponding task with reference to the information regarding the available resource (S260). For example, in the case of FIG. 1, the supply node, Node 1 10_1, may request the supply node, Node 3 20, to process Task 2 of the supply node.

Through the above-described process, the distributed processing device 100 may perform the resource assignment method to assign the available resource for processing the requested task, and, through this method, may calculate the size of the necessary resource for every task, may determine the priority, and may dynamically assign the resource. Therefore, when a new task is added to the distributed cluster, an overhead caused by frequent re-assignment of whole resources can be reduced. In addition, a processing speed may be enhanced by considering the network distance between the nodes in which input data is stored due to the characteristic of the divided tasks.

Figure 3:
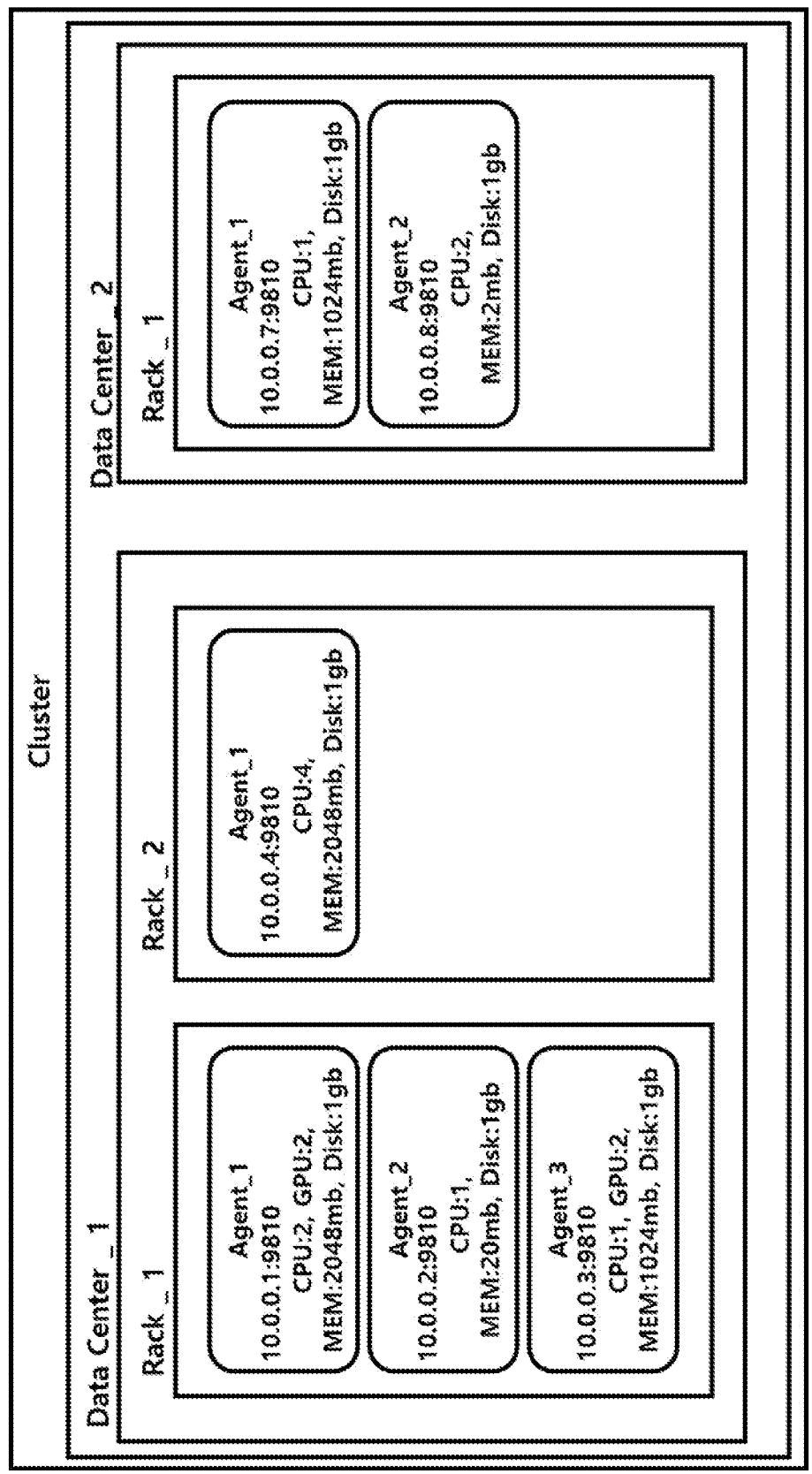
FIG. 3 is a view showing an example of a distributed processing environment according to an embodiment of the present disclosure.

FIG. 3 is a view showing an example of a distributed processing environment according to an embodiment of the present disclosure.

A cluster is a set of data centers, the data center is a set of racks, and the rack is a set of agents corresponding to nodes. The agent may determine proximity to another agent according to which center and which rack the agent belongs to.

An example of a method for assigning resources when the cluster of the distributed processing environment is configured as shown in FIG. 3 will be described below.

FIG. 4 is a table showing a list of demands and supplies for distributed processing of tasks according to an embodiment of the present disclosure.

When the order of the demands and the supplies registered at the market of the distributed processing device 100 is as shown in the table of FIG. 4, the third supply is selected as one of the agents that satisfies requested resources in the first rack having the most available resources in the same data center when the first demand requests resources.

Scores regarding demand_1 and demand_2 registered before supply_1 are calculated. Matching scores of the corresponding supply, supply_1, with previous demands, demand_1 and demand_2, are illustrated in FIG. 5. FIG. 5 is a table showing the scores of the demand nodes with respect to the supply node, supply_1, according to an embodiment of the present disclosure.

Referring to FIG. 4 and FIG. 5, the Bid of demand_1 is 50 and the Cost is 10 since the servers of the input node and the supply are different. Therefore, the score of demand_1 is 5. The Bid of demand_2 is 100 and the Cost is 20 since the servers of the input node and the supply are different and there is a difference in the number of CPUs. Therefore, the score of demand_2 is 5. That is, the scores of the two demands are the same, and when there are tasks having the same highest scores, the distributed processing device 100 may assign the task the task information of which is received first and which is registered as a supply to the available resource. Accordingly, the resource (dc: 1, rack: 1, server: 10.0.0.1>) of supply_1 is assigned to the task of the first registered demand, demand_1.

The fifth supply, supply_2, may be selected as one of the agents that satisfies requested resources in the second rack having the most available resources in the same data center when the second demand requests resources. In addition, the scores of the demand nodes with respect to supply_2 are illustrated in FIG. 6. FIG. 6 is a table showing the scores of the demand nodes with respect to supply_2.

The Bid of demand_2 is 100 and the Cost is 100 since the racks of the input node and the supply are different. Therefore, the score of demand_2 is 1. The Bid of demand 3 is 20 and the cost is 1. Therefore, the score of demand 3 is 20. Therefore, available resource (dc: 1, rack: 2, server: 10.0.0.4>) of supply_2 is assigned to the task of demand 3.

The sixth supply, supply_3, may be selected as one of the agents that satisfies requested resources in the first rack having the most available resources in the same data center when the fourth demand requests resources. Since there is one supply and necessary resources are satisfied, supply_3 and demand_2 are matched with each other and resources are assigned.

As described in the above example, when there is a difference between the size of the necessary resource and the size of the resource of the supply, a high Cost is set even if the Bid is high. Therefore, there is a high possibility that a task requesting resources is matched with a supply assigned in response to the corresponding request. When the size of the necessary resource and the size of the resource of the supply are the same, a task of a close node may be selected according to a network distance even if the task does not request the corresponding supply. In this case, since the sizes of the resources are the same, the remaining tasks may be processed with the supply requested by the other tasks.

Figure 7:
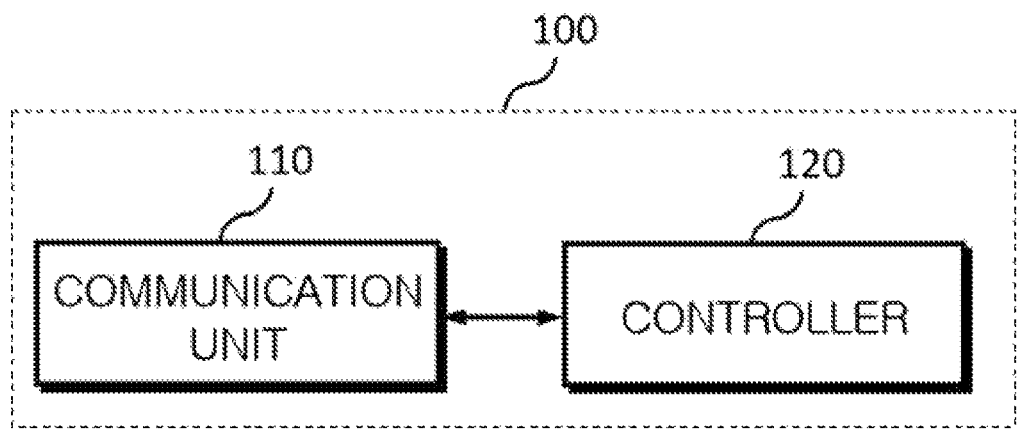
FIG. 7 is a block diagram showing a schematic configuration of a distributed processing device according to an embodiment of the present disclosure.

FIG. 7 is a block diagram showing a schematic configuration of the distributed processing device 100 according to an embodiment of the present disclosure. As shown in FIG. 7, the distributed processing device 100 includes a communication unit 110 and a controller 120.

The communication unit 110 may connect the plurality of supply nodes and the plurality of demand nodes to communicate with one another, and may receive information regarding a plurality of tasks from the plurality of demand nodes and may receive information regarding an available resource from the supply node. The communication unit 110 may be connected with a plurality of servers in a wire or wireless manner.

The controller 120 controls an overall operation of the distributed processing device 100. In addition, when the information regarding the plurality of tasks is received from the plurality of demand nodes, the controller 120 may calculate a size of a resource necessary for each of the plurality of tasks, and, when the information regarding the available resource is received from the supply node, the controller 120 may assign one of the plurality of tasks to the corresponding available resource based on the calculated size of the resource necessary for each task. Specifically, the controller 120 may control to perform the above-described operations of the distributed processing device 100.

The distributed processing device 100 having the above-described configuration may be a computer or a server device, or may be any device that can perform distributed processing.

The technical idea of the present disclosure may be applied to a computer-readable recording medium which records a computer program for performing the function and the resource assignment method of the distributed processing device according to embodiments. In addition, the technical idea according to various embodiments of the present disclosure may be implemented in the form of a programming language code recorded on the computer-readable recording medium and readable by a computer. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A code or program that is stored in the computer readable recording medium and readable by a computer may be transmitted via a network connected between computers.

Although the present specification and drawings describe a configuration of an exemplary device, an implemented thing of an functional operation and a subject explained in the present specification may be implemented by different types of digital electronic circuits, or may be implemented by computer software, firmware, or hardware including the structure disclosed in the present specification and a structural equivalent thereto, or may be implemented by a combination of one or more of computer software, firmware, or hardware.

Accordingly, while exemplary embodiments have been particularly shown and described above, it will be understood by those of ordinary skill in the art that various changes in form and details may be made therein without departing from the spirit and scope.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A method for assigning a resource in a distributed processing system including a distributed processing device to process a task of a plurality of tasks grouped in at least one directed acyclic graph (DAG) using a continuous double auction (CDA) protocol, the method comprising:
   receiving, by the distributed processing device, first information regarding the plurality of tasks from a plurality of first nodes;
   calculating, by the distributed processing device and based on the received first information, a size of resources necessary for each of the plurality of tasks;
   receiving, by the distributed processing device, second information regarding an available resource from a second node;
   assigning, by the distributed processing device, one of the plurality of tasks to the available resource of the second node, based on a calculated score for each of the plurality of tasks; and
   processing the assigned task using the available resource;
   wherein the assigning comprises calculating each score of the plurality of tasks, and assigning a first task having a highest score among the calculated each score of the plurality of tasks to the available resource of the second node,
   wherein the each score is calculated by dividing a bid for each task, among the plurality of tasks, by each cost of assigning the each task to the available resource of the second node,
   wherein the bid for the each task is calculated by dividing a predetermined value by, among the plurality of tasks, the number of tasks included in one DAG,
   wherein the each cost is calculated by considering the calculated size of the resources necessary for each task including
      a difference between the number of available Central Processing Units (CPUs) included in the available resource and a number of necessary CPUs for the each task,
      a difference between an available memory included in the available resource and a necessary memory for the each task, and
      a network distance between the first node and the second node, and
   wherein the predetermined value is a pre-set value according to a priority corresponding to a type of the each task.

2. The method of claim 1, wherein the network distance corresponds to a first distance value when the first node and the second node belong to different data center, to a second distance value when the first node and the second node belong to different racks in the same data center, to a third distance value when the first node and the second node belong to different servers in the same rack, and to a fourth distance value when the first node and the second node belong to the same server.

3. The method of claim 2, wherein the first distance value is larger than the second distance value, the second distance value is larger than the third distance value, and the third distance value is larger than the fourth distance value.

4. The method of claim 1, further comprising transmitting, to the first node, the information regarding the available resource of the second node.

5. The method of claim 1, wherein the calculating comprises calculating the size of the resource including the number of CPUs and a memory capacity necessary for each task.

6. A distributed processing device for processing a task of a plurality of tasks grouped on at least one directed acyclic graph (DAG) using a continuous double auction (CDA) protocol, comprising:
 a communication unit configured to receive first information regarding a plurality of tasks from a plurality of first nodes, and to receive second information regarding an available resource from a second node; and
 a controller configured to,
  receive the first information regarding the plurality of tasks from the plurality of first nodes,
  calculate a size of resources necessary for each of the plurality of tasks,
  receive the second information regarding the available resource from the second node,
  assign one of the plurality of tasks to a corresponding available resource, based on a calculated score for each of the plurality of tasks; and
  process the assigned task using the corresponding available resource;
 wherein the controller is configured to calculate each score of the plurality of tasks, and assign a first task having a highest score among the calculated each score of the plurality of tasks to the available resource of the second node,
 wherein the controller is configured to calculate the each score by dividing a bid for each task, among the plurality of tasks, by each cost of assigning the each task to the available resource of the second node,
 wherein the controller is configured to calculate the bid for the each task by dividing a predetermined value by, among the plurality of tasks, the number of tasks included in one DAG,
 wherein the controller is configured to calculate the each cost by considering the calculated size of the resources necessary for each task including
  a difference between the number of available Central Processing Units (CPUs) included in the available resource and a number of necessary CPUs for the each task,
  a difference between an available memory included in the available resource and a necessary memory for the each task, and
  a network distance between the first node and the second node, and
 wherein the predetermined value is a pre-set value according to a priority corresponding to a type of the each task.

7. A distributed processing system using a continuous double auction (CDA) protocol, comprising:
 a plurality of first nodes configured to transmit first information regarding the plurality of tasks;
 a second node configured to transmit second information regarding an available resource; and
 a distributed processing device to process a task of a plurality of tasks grouped in at least one directed acyclic graph (DAG) and configured to,
  receive the first information regarding the plurality of tasks from the plurality of first nodes,
  calculate a size of resources necessary for each of the plurality of tasks,
  receive the second information regarding the available resource from the second node,
  assign one of the plurality of tasks to a corresponding available resource, based on a calculated score for each of the plurality of tasks; and
  process the assigned task using the corresponding available resource;
 wherein the distributed processing device is configured to calculate each score of the plurality of tasks, and assign a first task having a highest score among the calculated each score of the plurality of tasks to the available resource of the second node,
 wherein the distributed processing device is configured to calculate the each score by dividing a bid for each task, among the plurality of tasks, by each cost of assigning the each task to the available resource of the second node,
 wherein the distributed processing device is configured to calculate the bid for the each task by dividing a predetermined value by, among the plurality of tasks, the number of tasks included in one DAG, and
 wherein the distributed processing device is configured to calculate the each cost by considering
  a difference between the number of available Central Processing Units (CPUs) included in the available resource and a number of necessary CPUs for the each task,
  a difference between an available memory included in the available resource and a necessary memory for the each task, and
  a network distance between the first node and the second node, and
 wherein the predetermined value is a pre-set value according to a priority corresponding to a type of the each task.

* * * * *